Figure 1:
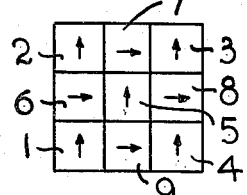

July 11, 1961   G. T. BORCHERDT   2,992,426
ELECTRO-MAGNETIC-RADIATION-ABSORPTIVE ARTICLE AND
METHOD OF MANUFACTURING THE SAME
Filed Jan. 18, 1946

Electromagnetic-Radiation-Absorption Film
Electromagnetic-Radiation-Reflective Backing Gerald T. Borcherdt  *Inventor*

By  A. F. Miller
                 *Attorney*

United States Patent Office

2,992,426
Patented July 11, 1961

2,992,426
ELECTRO-MAGNETIC-RADIATION-ABSORPTIVE ARTICLE AND METHOD OF MANUFACTURING THE SAME
Gerald Tennyson Borcherdt, Wilmington, Del., assignor to E. I. du Pont de Nemours and Company, Wilmington, Del., a corporation of Delaware
Filed Jan. 18, 1946, Ser. No. 641,946
9 Claims. (Cl. 343—18)

This invention relates to electromagnetic-radiation-absorptive articles. More particularly, it relates to new types of such articles having controlled directionality in their radiation absorptivity, and to improved methods for obtaining such articles.

Articles having the property of absorbing electromagnetic radiations are composed of two essential parts, viz., an electromagnetic-radiation-reflective backing and attached thereto, an electromagnetic-radiation-absorptive layer of predetermined uniform thickness.

The term "electromagnetic-radiation-reflective backing" as used herein means any electrically conductive material having an electrical resistivity of less than 100 microhm-centermeters at 0° C. and having a form which reflects substantially completely radiations having a frequency of $10^6$ to $10^{11}$ cycles per second. Usually metal foils, plates, or sheets are used as the radiation-reflective backing.

The term "electromagnetic-radiation-absorptive" as applied herein to any composition, film, layer or sheet means any composition comprising a film-forming organic polymer and finely divided electrically conductive material which composition, when attached in some form to an electrically conductive backing, will absorb electromagnetic radiations having a frequency within the range of $10^6$ to $10^{11}$ cycles per second. Usually such compositions contain a finely divided metallic or non-metallic pigment having an electrical resistivity of less than 5000 microhm-centimeters at 20° C., or a mixture of such pigments, with or without fillers, reinforcing agents or auxiliary agents.

The terms "directional" and "non-directional," and their variants, as used herein are explained as follows. When the ordinary methods for preparing films or sheets of plastic composition are used in the preparation of electromagnetic-radiation-absorptive films, they produce films which absorb to different extents plane polarized electromagnetic radiations of a given frequency which strike the surface of the film at different angles with respect to the plane of polarization of the beam of radiations. In other words, a beam of plane polarized electromagnetic radiations of any given frequency striking the surface of such a film when it is attached to an electromagnetic-radiation-reflective backing, is absorbed to different extents when the film or sheet is rotated 90° in the plane of its surface and the angle of incidence of the beam of radiations is held constant. Such films are termed "directional." Conversely, any electromagnetic-radiation-absorptive film or composition which, when attached to an electromagnetic-radiation-reflective backing, absorbs to substantially the same degree all plane polarized electromagnetic radiations of a given frequency striking its surface at a given angle of incidence irrespective of the angle between a given line in the plane of the film and the line formed by the intersection of the plane of polarization of the beam of radiations with the film, is called "non-directional."

The term "orientation" as used herein and in the claims refers to that direction in which the electromagnetic-radiation-absorptive film or sheet was formed. The extent of absorption of plane polarized electromagnetic radiations of any given frequency by directionally absorptive films varies in relation to the angle between the plane of polarization of the radiations and the orientation of the film. Thus, any directionally absorptive film having a maximum absorption of plane polarized radiations of given frequency striking its surface with the plane of polarization parallel to the orientation of the film will absorb radiations of this particular frequency to a lesser degree as the film is rotated in its plane through 90° C. (with the angle of incidence of the radiations held constant). However, this same directional film will absorb to the same maximum degree radiations of some different frequency when the plane of polarization of such radiations is at right angles to the orientation of the film. The frequency at which maximum absorption occurs has been found to be lowest when the plane of polarization of the radiations is parallel to the orientation of the film.

Several varieties of electromagnetic-radiation-absorptive articles of both directional and non-directional types are known. Among such articles of the non-directional type are those comprising a metal foil backing having attached thereto a composite film of uniform thickness prepared by spraying multiple coats of an electro-magnetic-radiation-absorptive composition alternately at right angles to each other. Also known are non-directional electromagnetic-radiation-absorptive articles which consist of a radiation-reflective backing having attached thereto a composite electromagnetic-radiation-absorptive sheet made up of numerous individually directional films (each film prepared, for example, by calendering) so arranged that the direction of orientation of each film is at right angles to that of adjacent films. Related to the last-mentioned type of non-directional electromagnetic-radiation-absorptive article are those, also known, comprising an electromagnetic-radiation-reflective backing attached to a plurality of individually directional films arranged in two layers (the outer layer amounting to between 20 and 33% of the total thickness), the orientation of the films making up each layer being parallel and the orientation of the two layers being at right angles.

Available methods for producing these known types of non-directional electromagnetic-radiation-absorptive articles possess certain disadvantages, especially when operated on a large scale. Thus, the cross-spraying method is of limited practical value because of the excessively large number of individually sprayed layers which must be applied to obtain a final film of the desired thickness for certain applications, especially for the preparation of films having a thickness of 25 to 50 mils or greater. In respect to the other mentioned types, it is quite difficult to prepare calendered films or sheets having the exact predetermined and highly uniform thickness essential for the individual layers which are to be cross-laminated and applied to a radiation-reflective backing. Furthermore, in the mechanically simplest method known for preparing thick sheets (slicing a block molded from calendered sheets of a radiation-absorptive composition) non-directional sheets cannot be obtained unless the block is built up from alternately cross-laminated sheets and sliced parallel to the laminae to form a sheet sufficiently thick to include at least 10 of the individually directional laminae. Hence, this method is not practical for the preparation of relatively thin, e.g. 25 mils thick, non-directional films desired for certain applications, since it is very difficult to obtain calendered films of the necessary thickness uniformity at the thickness (2.5 mils) required for the individual laminae for such a sheet.

This invention has as an object a new type of electromagnetic-radiation-absorptive article. A further object is an electro-magnetic-radiation-absorptive film of controlled directionality. A further object is a new type of non-directional film. Still further objects reside in methods for making these articles and films.

These and other objects appearing hereinafter are accomplished by the present invention of an electromagnetic-radiation-absorptive article comprising essentially an electromagnetic-radiation-reflective backing having attached thereto an electromagnetic-radiation-absorptive tessellated but continuous sheet of uniform thickness, i.e., a sheet made up of a plurality of individually directional oriented electromagnetic-radiation-absorptive plane sections welded together edgewise and so arranged that the orientation of a substantial proportion of the surface area of the sheet is different from the orientation of the remaining surface area. The invention also includes the methods described hereinafter for making such tessellated sheets and articles comprising them.

In a more restricted form of the invention the above mentioned individually directional electromagnetic-radiation-absorptive plane sections are so arranged that the orientation of each individual section in at least 40% but not more than 60% of the total surface area of the assembled mosaic sheet is at right angles to the orientation of another section present in the remaining surface area. In a still more restricted and preferred form of the invention, adjacent tessera or sections are "cross-oriented," i.e., so arranged that their orientation is at right angles.

In one method for making the products of this invention, small individually directional sections of electromagnetic-radiation-absorptive sheets are placed on an adhesive-coated metal foil in a checkerboard or other appropriate geometric fashion, the assembly then being pressed at elevated temperatures to fuse or weld the individual sections together edgewise and to adhere them to the metal backing. Non-directional articles are obtained when the orientation of any given section is at right angles to the orientation of the adjacent sections, and when the total area of all sections having parallel orientation amounts to from 40 to 60% of the total area of the composite sheet.

In another method for making the products of this invention, a thick continuous block is molded from smaller square or rectangular blocks (each composed of a directional electromagnetic-radiation-absorptive composition) so arranged that the orientation in any given small block is in a direction at right angles to that of all adjacent blocks, the top area of all small blocks which have parallel orientation amounting to from 40 to 60% of the total top area of the composite block; sheets of predetermined thickness are sliced from the composite block so as to include sections from all the component blocks; and these sheets are adhered to a metal backing to form a non-directional electromagnetic-radiation-absorptive article.

Figure 8:
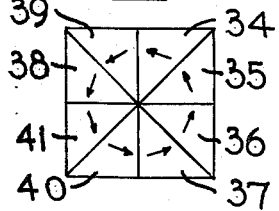
Figure 9:
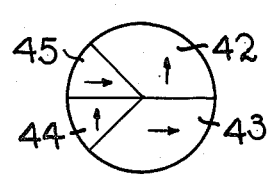
Figure 10:
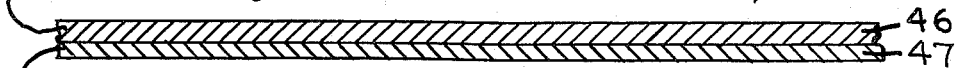

In the accompanying drawings FIGURES 1 to 9 inclusive are diagrammatic views in plan showing different arrangements of the individually directional sections in the composite sheet which forms the electromagnetic-radiation-absorptive element of the electromagnetic-radiation-absorptive article described herein, and FIG. 10 illustrates in cross-section the article of this invention.

The construction of each of the embodiments shown in FIGURES 1 to 7 is particularly described in a correspondingingly numbered example as will appear hereinafter. In FIGURE 1 the individually directional sections are of equal area and are in the form of squares of which the orientation of those numbered 1, 2, 3, 4 and 5 is at right angles to those numbered 6, 7, 8 and 9. The area of the first mentioned squares, in which the orientation is indicated by vertical arrows, constitutes 55.6% of the total area of the composite sheet. The area of the second mentioned squares, in which the orientation is indicated by horizontal arrows, constitutes 44.4% of the total area of the composite sheet. The direction of orientation in the remaining figures is likewise indicated by the vertical and horizontal arrows.

Figure 2:
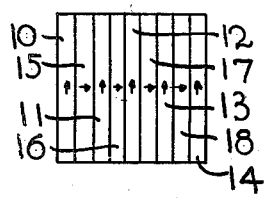

In FIGURE 2 the individually directional sections are of equal area and are small rectangles of which the orientation of those numbered 10, 11, 12, 13 and 14 is at right angles to those numbered 15, 16, 17 and 18. The area of the rectangles oriented in one direction is therefore 55.6% of the total area, and the area of the remaining rectangles is 44.4% of the total area.

Figure 3:
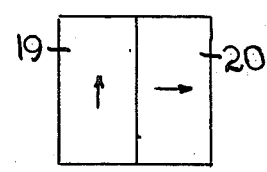
Figure 5:
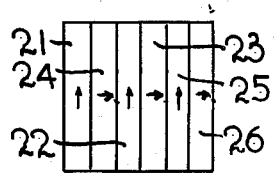
Figure 7:
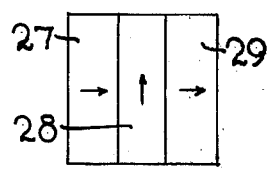

In FIGURES 3, 5 and 7 the individually directional sections are also in rectangular form and of the same area in each figure. FIGURE 3 is composed of two elements 19 and 20 which are of equal area and in which the direction of orientation of one section is at right angles to that of the other section. In FIGURE 5 the area oriented in one direction is also equal to the area oriented in the other direction by means of six rectangles, the orientation of those numbered 21, 22 and 25 being at right angles to the orientation of those numbered 24, 23 and 26. The composite film of FIGURE 7 is composed of three rectangles 27, 28 and 29 with the orientation in sections 27 and 29 parallel to each other and at right angles to that of section 28, the latter section constituting 33% of the total area and the other two sections 67%.

Figure 4:
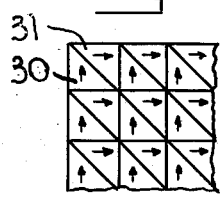
Figure 6:
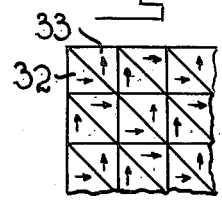

In FIGURES 4 and 6 the individually directional sections, numbered 30 and 31 in FIGURE 4 and numbered 32 and 33 in FIGURE 6, are triangles of equal area. In FIGURE 4 the orientation in adjacent triangles is perpendicular, so that the direction of orientation in one half of the triangles is perpendicular to the orientation in the other half of the triangles. In FIGURE 6 although the orientation in each triangle is not perpendicular to that in all the adjacent triangles, there is for each triangle oriented in one direction another triangle the orientation of which is perpendicular thereto.

In FIGURE 8 the sections are also triangles of equal area, the direction of orientation in triangles 34, 35, 36 and 37 being at right angles to that in triangles 38, 39, 40 and 41 respectively.

In FIGURE 9 the sections are sectors of a circle in which the areas of the two large sectors 42 and 43 are equal and in which the areas of the two small sectors 44 and 45 are equal. Since the orientation of the two large sectors is at right angles to each other and the orientation of the two small sectors is at right angles to each other, and since the orientation of sectors 44 and 45 is at right angles to that of sectors 43 and 42 respectively, 50% of the total area is oriented in one direction and 50% in a direction perpendicular thereto.

In FIGURE 10 the numeral 46 indicates the composite electromagnetic-radiation-absorptive film, and the numeral 47 indicates the electromagnetic-radiation-reflective backing.

This invention is further ilustrated by the following examples in which the proportions of ingredients are expressed as parts by weight unless otherwise specified.

*Example I*

| Ingredients: | Parts by weight |
|---|---|
| Polymeric 2-chlorobutadiene-1,3 (a polymer known commonly as "Neoprene GRM-10") | 25.875 |
| Sodium acetate trihydrate | 0.312 |
| Light calcined magnesia | 1.0 |
| Stearic acid | 0.125 |
| Phenyl-beta-naphthylamine | 0.50 |
| Mixture of waxes known commercially as "Heliozone" | 1.312 |
| Crown Clay | 9.125 |
| Semi-reinforcing furnace black | 14.0 |
| Finely divided nickel flake | 15.375 |
| Light mineral oil | 1.312 |
| Zinc oxide | 1.312 |

The above ingredients are mixed in a rubber mill until homogeneous, the resulting stock sheeted from the rolls and calendered into a sheet about 36 inches wide and 21 mils (0.021 inch) thick, and this calendered sheet cut into sections 36 inches square. Five of these 36-inch-square sections are stacked together with their orientation, i.e., the direction of passage through the calender rolls, parallel, and this stack of sheets is then cut into sections 3 inches square. A sheet of aluminum foil 9 inches square and 2 mils thick, one surface of which has been roughened slightly by abrasion, is coated on the roughened side with the adhesive solution known commercially as "Pliobond," the adhesive layer being about 0.5 mil thick after air drying. Nine 3-inch-square stacks, each stack composed of five 21-mil-thick sheets having parallel orientation, are placed on the coated surface of the foil in checkerboard fashion with the orientation of each stack at right angles to that of the adjacent stacks, as illustrated in FIGURE 1. The entire assembly, of total thickness about 107.5 mils, is pressed for 30 minutes at 140° C. and 1000 lb./sq. in. in a hydraulic press having shims of 93 mils thickness between the platens of the press. After cooling under pressure, the composite foil-backed sheet is removed from the press. The resulting element is 78 mils thick, and it absorbs substantially completely electromagnetic radiations having a frequency between $6.8 \times 10^9$ and $7.4 \times 10^9$ cycles/second. It is also non-directional in its absorptivity; i.e., all plane polarized radiations striking the surface of the sheet at a given angle of incidence are absorbed to substantially the same extent when the sheet is rotated in its plane through an angle of 90° while the angle of incidence of the radiations is maintained constant.

*Example II*

Five electromagnetic-radiation-absorptive calendered sheets of 21 mils thickness prepared from the ingredients and by the methods of Example I are stacked together with their orientation parallel. This stack is then cut into strips 1 inch wide and 9 inches long, half of the strips being cut with the orientation of the sheet lengthwise of the strips, and the other half being cut with the orientation crosswise of the strips. Five stacks of strips in which the orientation is lengthwise and four stacks in which it is crosswise are placed on a 9-inch square of aluminum foil 2 mils thick (the surface previously coated with "Pliobond" by the procedure of Example I), with the orientation of adjacent stacks of strips at right angles to one another, as illustrated in FIGURE 2. The assembly is pressed under the conditions of Example I. The resulting element is 76.5 mils thick, and it absorbs substantially completely plane polarized electromagnetic radiations having a frequency within the range of $6.8 \times 10^9$ and $7.4 \times 10^9$ cycles/second, such absorptivity being substantially non-directional.

*Example III*

A composition similar to that of Example I is prepared by the method of that example and calendered into sheets of 15 mils thickness and 36 inches wide which are then cut into 36-inch squares. Seven of these sheets are stacked together with their orientation parallel. From these stacks are cut two smaller stacks of section 4½ inches wide and 9 inches long, one stack being cut with the orientation of individual sections lengthwise of the sections, and the other stack being cut with the orientation crosswise of the sections. These two stacks of sheets are then placed on a 9-inch square of aluminum foil 2 mils thick (the surface previously coated with "Pliobond" by the procedure of Example I) with the orientation of each stack at right angles to that of the other, as illustrated in FIGURE 3. The entire assembly, of total thickness about 107 mils, is pressed for 30 minutes at 140° C. and 1,750 lb./sq. in. in a hydraulic press having shims of 84 mils thickness between the platens of the press. After cooling under pressure for 15 minutes, the composite foil-backed sheet is removed from the press. The resulting element is 81 mils thick and it absorbs 95% of electromagnetic radiations having a frequency between $6.25 \times 10^9$ and $6.82 \times 10^9$ cycles per second. It is also non-directional in its radiation absorptivity, i.e., all plane polarized radiations of the above frequencies striking the surface of the sheet at a given angle of incidence are absorbed to substantially the same extent when the sheet is rotated in its plane through an angle of 90° C. while the angle of incidence of the radiations is held constant.

*Example IV*

Seven of the 36-inch-square calendered sheets of Example III are stacked together with their orientation parallel. The stack is then cut into sections 2 inches square. These stacks of seven 2-inch-square sections are next cut diagonally so that each new stack is composed of seven smaller sections having the form of a 90° isosceles triangle. Fifty stacks, each stack composed of 15-mil-thick sections of films of triangular cross-section having parallel orientation, are placed on a 10-inch square of aluminum foil 2-mils thick (the surface previously coated with "Pliobond" by the procedure of Example I) with the orientation of adjacent stacks of triangles at right angles to each other, as illustrated in FIGURE 4. The entire assembly, of total thickness about 107 mils, is pressed for 30 minutes at 140° C. and 1,750 lb./sq. in., in a hydraulic press having shims of 84 mils thickness between the platens of the press. After cooling under pressure for 15 minutes, the composite foil-backed sheet is removed from the press. The resulting element is 77 mils thick and it absorbs 95% of all electromagnetic radiations having a frequency between $6.58 \times 10^9$ and $7.52 \times 10^9$ cycles per second. It is also non-directional in its absorptivity, i.e., all plane polarized radiations of the above-specified frequencies striking the surface of the sheet at a given angle of incidence are absorbed to substantially the same extent when the sheet is rotated in its plane through an angle of 90° while the angle of incidence of the radiations is held constant.

*Example V*

The 36-inch calendered sheets of Example III are cut into strips 2 inches wide and 9 inches long, half of the strips being cut with the orientation of the calendered sheet lengthwise of the strips, and the other half being cut with the orientation crosswise of the strips. These 2-inch by 9-inch strips are stacked together into stacks about 1 inch high containing equal numbers of individual sections, with the orientation of each section in any one stack parallel to that of all the others in that stack. Three of these stacks having their orientation lengthwise of the strips and three stacks having their orientation crosswise of the strips are arranged on a corrugated steel base so as to form a rectangle 9 inches wide and 12 inches long with the orientation of adjacent stacks of strips at right angles to each other, as illustrated in FIGURE 5. The assembly is pressed in a hydraulic press with heavy metal sides bolted around the stacks of strips and heated for 4 hours at 130–140° C. under a pressure of 1000 lb./sq. in. The resulting heat-pressed slab or block, firmly adhered to the corrugated base, is attached by means of the base to a movable platform which can be drawn under an adjustable stationary knife about 13 inches long. The block is then sliced into four 9 inch x 12 inch sheets having the predetermined thickness of 157 mils (±1 mil) and into three sheets having the predetermined thickness of 76 mils (±1 mil). Seven sheets of aluminum foil 9 inches x 12 inches and 2 mils thick, one surface each of which has been roughened slightly by abrasion, are coated on the roughened sides with the adhesive solution known commercially as "Pliobond," the adhesive layers being about 0.5 mil thick after air drying. Single 9 inch x 12 inch sliced sheets are placed on the coated surfaces of each of the seven sheets of aluminum foil;

these assemblies are placed in the openings in a multideck hydraulic press having polished metal plates ¼" thick between the bottom foil and the platen and between the top sheet and the platen; and heavy cloth pads are inserted above the top plates to insure uniform pressure distribution over the whole surface of the sheet. The entire assembly is pressed for 10 minutes at 93° C. at a pressure of 300 lb./sq. in., the assembly then being cooled under pressure for 20 minutes. The adhesion between the foil and the sheet in the resulting heat-pressed elements is stronger than the adhesion between individual layers in the sheet. The resulting foil-backed sheets of 157 mils thickness absorb 95% of all electromagnetic radiations having a frequency within the range of $2.8 \times 10^9$ and $3.1 \times 10^9$ cycles/second, and the sheets having a thickness of 76 mils absorb 95% of all electromagnetic radiations having a frequency within the range of $6.8 \times 10^9$ to $7.5 \times 10^9$ cycles per second. They are non-directional in their absorptivity as they absorb to substantially the same extent all plane polarized radiations of the above frequencies which strike the sheets irrespective of the angle through which the film may be rotated in its plane while maintaining the angle of incidence of the radiating constant.

*Example VI*

Fifty stacks, each composed of seven of the triangular sections of 15-mils-thick sheets of Example IV having parallel orientation, are placed on the adhesive-coated surface of a 10-inch square of aluminum foil in the manner illustrated by FIGURE 6, and heated and pressed under the conditions of Example IV. The resulting element is 85 mils thick and it absorbs 95% of all radiations having a frequency between $5.86 \times 10^9$ and $6.45 \times 10^9$ cycles per second. It is also non-directional in its absorptivity.

*Example VII*

A composition similar to that of Example 1 is prepared by the method of that example and calendered into sheets of 15 mils thickness and 36 inches wide which are then cut into 36-inch squares. Seven of these sheets are stacked together with their orientation parallel. From these stacks are cut three smaller stacks of strips 3 inches wide and 9 inches long, one stack being cut with its orientation lengthwise of the strip, and the other two stacks being cut with their orientation crosswise of the sections. These three stacks of strips are placed on the adhesive-coated surface of a 9-inch square of aluminum foil 2 mils thick in the manner illustrated by FIGURE 7 and heat-pressed under the conditions of Example III. The resulting element is 80 mils thick and 67% of its surface area is composed of sections having their orientation at right angles to that of the remaining 33% of the area. It absorbs 95% of all radiations having frequencies between $6.38 \times 10^9$ and $6.73 \times 10^9$ cycles per second when the plane of polarization of these radiations is parallel to the orientation of the cross-wise oriented strips, and it absorbs the same percentage of radiations having frequencies of $6.27 \times 10^9$ to $7.18 \times 10^9$ cycles per second when the plane of polarization of the radiations is at right angles to the orientation of the cross-wise oriented strips.

This invention has been illustrated with particular reference to cross-oriented, electromagnetic-radiation-absorptive articles prepared by certain methods and from certain electromagnetic-radiation-absorptive compositions; however, the invention is not limited to these specific embodiments. The invention includes electromagnetic-radiation-absorptive articles composed of any electromagnetic-radiation-reflective backing having attached thereto an electromagnetic-radiation-absorptive tessellated but continuous sheet of uniform thickness composed of a plurality of individually directional plane sections arranged in any mosaic or geometric pattern and welded together edgewise, with the orientation of a substantial proportion, i.e., at least 15%, of the surface area of the sheet different from the orientation of the remaining surface area. In a non-directional tessellated sheet it is essential that the degree of directionality be substantially the same in all the sections making up the composite sheet.

As indicated above, the electromagnetic-radiation-reflective backing of the articles of this invention can be any material which reflects substantially all electromagnetic radiations of any particular frequency within the range of $10^6$ to $10^{11}$ cycles/second striking its surface. Such radiation-reflective backings are electrically conducting materials having an electrical resistivity of less than 100 microhm-centimeters at 0° C. In addition to the aluminum foil of the examples, foil, sheets or plates of this or any other metal having the above-defined resistivity, such as, for example, iron, steel, copper, brass, nickel, bismuth, gold, lead, silver, etc., can be used. Fine mesh screen made of metals such as these are also useful as the backing member. Another type of reflective backing which is effective is a silver paint having a high conductivity.

Likewise, the compositions from which the directionally absorptive sections can be prepared are not limited to the specific electromagnetic-radiation-absorptive compositions of the examples. They may be prepared from any composition having the property, when joined in some form to an electromagnetic-radiation-reflective backing, of absorbing or modifying electromagnetic radiations. Such compositions usually comprise a tough, organic film-forming polymer having dispersed uniformly therein as a finely divided active ingredient, an electrically conductive pigment having an electrical resistivity of less than 5000 microhm-centimeters at 20° C. such as metallic or non-metallic powders of flakes or mixtures of these. The selection of the particular ingredients for any particular electromagnetic-radiation-absorptive composition depends on various factors such as the particular band of electromagnetic radiations to be absorbed or modified, the particular conditions of exposure to be met by the electromagnetic-radiation-absorptive article, and the particular method to be used in forming the directionally absorptive sections of the electromagnetic-radiation-absorptive composition.

In addition to the polymeric chlorobutadiene of the examples, other film-forming binders which may be used in the compositions of this invention include: other butadiene elastomers such as polybutadiene, natural rubber, and interpolymers of butadienes with other polymerizable materials such as acrylonitrile, styrene, etc.; polymers of monoethylenically unsaturated hydrocarbons such as ethylene, isobutylene, styrene, and interpolymers of these with other polymerizable materials such as vinyl chloride, vinylidene chloride, vinyl acetate, etc.; cellulose derivatives such as ethyl cellulose and cellulose acetate; halogen containing polymers such as polyvinyl chloride, polyvinylidene chloride, and interpolymers of these with other polymerizable materials; and alkyd resins. The butadiene elastomers are particularly useful in the articles of this invention when the electromagnetic-radiation-absorptive sheet is to be prepared by a mill-mixing and calendering process.

In addition to the nickel flake and carbon black used as the active ingredients in the examples, other metallic and non-metallic pigments having an electrical resistivity of less than 5000 microhm-centimeters at 20° C. can be used, either alone or in various combinations, as the active ingredients of the electromagnetic-radiation-absorptive compositions of this invention. As in the case of the selection of a particular binder to be used, the selection of any particular active ingredient also depends on the particular use for which the electromagnetic-radiation-absorptive article is being designed. Other active ingredients which are particularly useful include metallic pigments such as aluminum, steel, copper, bronze, silver, gold, lead, the nickel-iron alloy known as "Permalloy," etc., in the form of thin flakes, non-metallic pigments such as graphite and other forms of powdered carbon having an absolute density of less than 3, e.g., acetlyene black and channel black. These active ingredients can be used in various proportions, depending on the particular material used and the particular electrical properties desired in the final electromagnetic-radiation-absorptive article. Compositions containing from 10–95%, by weight, of fine metallic flake, or from 10 to 75% by weight, of powdered carbon, or intermediate proportions of mixtures of metallic and non-metallic pigments are useful for various applications. In general, the proportions of active pigment to be used in an electromagnetic-radiation-absorptive film or sheet of any given thickness will vary inversely with the frequency of the radiations to be absorbed. Thus, for absorption of radiations having frequencies in the lower portion of the above-specified range of $10^6$ to $10^{11}$ cycles/second, the higher proportions of pigment specified above are required. When electromagnetic-radiation-absorptive sheets of different thicknesses are desired for the absorption of radiations of any given frequency, different proportions of active ingredients are required, higher proportions of active pigment (within the above-specified range) being required for the thinner sheets.

Various auxiliary components such as plasticizers, roll release agents, hardening agents, extenders, fillers, reinforcing agents and rust inhibitors can be used in the electromagnetic-radiation-absorptive sheets as needed or desired to improve the physical properties of the articles of this invention. The particular auxiliary agent selected will, of course, depend on the particular binder and particular active ingredient being used in the composition.

The individual directionally absorptive sections of the electromagnetic-radiation-absorptive sheets of this invention can be prepared by any of the known methods for producing directional electrommagnetic-radiation-absorptive sheets or films. Thus, in addition to the method of the examples in which the electromagnetic-radiation-absorptive composition is mixed in a roller mill and calendered into sheets, the sheets or films can be prepared by methods such as knife coating, roller coating, extruding, spraying, brushing, etc., in which the composition is formed or applied in the same direction. In such methods the film-forming device moves essentially in one direction in relation to the support on which the film or sheet is being prepared.

In these methods material comprising the film, usually the finely divided electrically conductive material, is essentially oriented in one direction in the plane of the film, and these films show the electrical directionality as described above.

The tessellated electromagnetic-radiation-absorptive articles of this invention have been illustrated with particular reference to those having non-directionality or a certain degree of directionality; however, other degrees of directionality can be obtained by controlling the degree of unbalance in the relative areas of sections having different orientation. Thus, if the ratio of the areas having orientation at right angles to each other is made larger than the ratio of 67:33 in Example VII, the resulting element will have greater directionality than the radiation-absorptive article of that example.

The non-directional electromagnetic-radiation-absorptive articles of this invention have been illustrated with particular reference to those prepared from tessellated sheets having 2, 6, 9 and 50 individually directional sections of square, rectangular, or triangular shapes, with the orientation of adjacent sections at right angles to each other (Examples I to V) and to those prepared from tessellated sheets having the cross-oriented adjacent sections made up of sub-sections having parallel orientation (Example VI). However, non-directional articles can be prepared from a plurality of any number of individually directional sections of any shape provided that the orientation of each individual section present in at least 40% but not more than 60% of the total surface area of the assembled mosaic or tessellated sheet is at right angles to the orientation of another section present in the remaining surface area. Other arrangements of sections in non-directional sheets are illustrated in FIGURES 8 and 9.

Surprisingly, the individually directional units in the tessellated articles of this invention can be greater in their minimum linear dimensions than the wave length of the particular electromagnetic radiations which the sheet is designed to absorb. Thus a 9-inch-square sheet composed of 4½-inch by 9-inch rectangular units is substantially non-directional in its absorption of radiation having a wave length of 1.8 inches. The maximum area of the individually directional units in a non-directional radiation-absorptive article depends only on the width of the beam of radiations receivable by the scanning device and its distance from the radiation-absorptive article. Thus, for a radiation-absorptive article to be non-directional, 40 to 60% of the area scanned by the receiver must have its orientation at right angles to the orientation in the remaining area.

It is essential for non-directionality that the the individually directional sections be welded or fused together edgewise into a continuous electromagnetic-radiation-absorptive sheet. If the individual sections are not welded together into a continuous sheet, but are only butted together, the composite foil-backed film remains directional, and in some cases, e.g., when the size of the sections is small with respect to the wave length of the radiations, the absorptive properties are lost. It is also essential that the degree of directionality of all the individual sections be substantially the same.

The examples have illustrated specifically the formation of tessellated electromagnetic-radiation-absorptive articles by heat-pressing stacks of several directional plane sections arranged in a tessellated, cross-oriented manner directly onto adhesive-coated aluminum foil, and by molding a tessellated block from cross-oriented stacks of several individually directional sheets, slicing the resulting continuous block into sheets of the desired thickness, and finally joining the non-directional sheet to a foil backing. However, the electromagnetic-radiation-absorptive articles of this invention can be made by still other modifications. The tessellated sheet can be prepared by arranging a single layer of individually directional sections of an electromagnetic-radiation-absorptive composition in a cross-oriented manner and heat-pressing the assembly so as to weld or fuse the edges of adjacent sections together, and joining the resulting composite film either during or subsequent to the heat-pressing operation to an electromagnetic-radiation-reflective backing such as a metal foil. In still another embodiment of the invention, non-directional sheets can be obtained by stacking a plurality of directional electromagnetic-radiation-absorptive sheets of any convenient thickness in a mold in a hydraulic press with the orientation of each sheet parallel to that of the others; heating these sheets under pressure so the individual sheets are welded uniformly together; cutting the resulting directionable block into columns of any desired shape, e.g., rectangles, triangles or squares; rearranging these individually directional columns in the mold so that the orientation of adjacent columns is at right angles to each other; reheating the cross-oriented columns under pressure until their edges are uniformly welded together; and then slicing the block into sheets of the desired predetermined thickness.

As indicated previously, various methods of adhering the electromagnetic-radiation-reflective backing to the tessellated electromagnetic-radiation-absorptive sheet can be used. The particular method employed in any given case depends on the particular composition and the particular backing material being used and on the conditions of exposure and intended use of the electromagnetic-radiation-absorptive article being prepared. In general, it is preferred to use an adhesive layer between the radiation-absorptive sheet and the radiation-reflective backing, as disclosed in the examples, since this usually gives better adhesion between the two layers. This type of bonding is particularly desirable when joining metal foil backings to electromagnetic-radiation-absorptive sheets which contain as the binder polymeric materials, e.g., butadiene elastomers, which are "cured" during the heat-pressing of the composition. However, if desired, the electromagnetic-radiation-absorptive sheet can be joined to the radiation-reflective backing without an intermediate adhesive layer when the radiation-absorptive sheet contains a binder, e.g., polyisobutylene, which provides satisfactory adhesion by mere heating and pressing. In some cases satisfactory adhesion can be obtained without heat-pressing. Various adhesives may be used, the particular one selected depending on the particular composition of the electromagnetic-radiation-absorptive sheet and the particular radiation-reflective baking being used. In addition to the "Pliobond" of the examples, the following adhesives are useful in certain applications: maleic acid-modified vinyl chloride/vinyl acetate interpolymers, neoprene base adhesives, rubber base adhesives such as that known commercially as "Vulcalock," and high molecular weight polyisobutylene. Improved adhesion usually results when the contact surface of the radiation-reflective backing is roughened slightly, for example by mechanical abrasion or by chemical etching; however, such roughening is not essential in all cases.

The tessellated electromagnetic-radiation-absorptive articles of this invention are particularly useful in applications requiring a controlled degree of directionality in the absorption of plane polarized electromagnetic radiations having a frequency within the range of $10^6$ to $10^{11}$ cycles per second. The non-directional articles of this invention are particularly useful for screening or shielding radiation-reflective objects from such radiations.

As many apparently widely different embodiments of this invention may be made without departing from the spirit and scope thereof, it is to be understood that I do not limit myself to the specific embodiments thereof except as defined in the appended claims.

I claim:
1. An electromagnetic-radiation-absorptive article comprising an electromagnetic-radiation-reflective backing having attached thereto an electromagnetic-radiation-absorptive tessellated but continuous sheet of uniform thickness, said sheet consisting of a plurality of individually directional plane sections in which the direction of maximum absorption of plane polarized electromagnetic radiations of a given frequency in some of said sections, to the extent of a substantial proportion of the total area of the sheet, is in a direction different from that in the remaining sections.

2. A substantially non-directional electromagnetic-radiation-absorptive article comprising essentially an electromagnetic-radiation-reflective backing having attached thereto a non-directional electromagnetic-radiation absorptive tessellated but continuous sheet of uniform thickness, said sheet consisting of a plurality of individually directional electromagnetic-radiation-absorptive plane sections in which the direction of maximum absorption of plane polarized electromagnetic radiations of a given frequency in each individual section in at least 40% but not more than 60% of the total surface area of the assembled mosaic sheet is at right angles to the direction of said maximum absorption of another section in the remaining surface area of the sheet.

3. A substantially non-directional electromagnetic-radiation-absorptive article comprising essentially an electromagnetic-radiation-reflective backing having attached thereto a non-directional electromagnetic-radiation-absorptive tessellated but continuous sheet of uniform thickness, said sheet consisting of a plurality of individually directional electromagnetic-radiation-absorptive plane sections in which the direction of maximum absorption of plane polarized electromagnetic radiations of a given frequency in at least 40% but not more than 60% of the total surface area is at right angles to that in the remaining surface area and the direction of said maximum absorption of each section being at right angles to that in all adjacent sections.

4. A process for obtaining an electromagnetic-radiation-absorptive article comprising an electromagnetic-radiation-reflective backing having attached thereto an electromagnetic-radiation-absorptive tessellated but continuous sheet of uniform thickness, said process comprising cutting a directionally absorptive preformed electromagnetic-radiation-absorptive composition into a plurality of sections, arranging these sections into a mosaic pattern in which the direction of maximum absorption of plane polarized electromagnetic radiations of a given frequency in a substantial proportion of the surface area of the sheet is in a direction different from said direction of maximum absorption of the remaining surface area, welding the sections together edgewise, forming a sheet of predetermined and uniform thickness from the assembled sections, and adhering said sheet to an electromagnetic-radiation-reflective backing.

5. In the manufacture of sheets which are non-directionally electromagnetic-radiation-absorptive when applied to an electromagnetic-radiation-reflective backing, the process comprising the steps of assembling in abutting relation individual sections of directionally electromagnetic-radiation-absorptive material so that the direction of maximum absorption of plane polarized electromagnetic radiations of a given frequency of each individual section in at least 40%, but not more than 60% of the total surface area of the assembled mosaic sheet is at right angles to said direction of maximum absorption of another section present in the remaining surface area, and welding the sections together by subjecting them to heat and pressure.

6. A process for obtaining an electromagnetic-radiation-absorptive article comprising an electromagnetic-radiation-reflective backing having attached thereto a non-directional electromagnetic-radiation-absorptive tessellated but continuous sheet of uniform thickness, said process comprising adhering to said backing individual plane sections of directionally electromagnetic-radiation-absorptive sheet material assembled in abutting relation in tessellated form, the direction of maximum absorption of plane polarized electromagnetic radiations of a given frequency in any section being at right angles to that in all adjacent sections, and the total surface area of all sections in which said directions of maximum absorption of plane polarized electromagnetic radiation are parallel being between 40% and 60% of the total surface area of the assembled mosaic sheet, and subjecting the assembly of said backing and sections to heat and pressure to weld said sections into a continuous film.

7. The electromagnetic-radiation-absorptive article defined in claim 1 in which said individually directional plane sectons are rectangular in form.

8. The electromagnetic-radiation-absorptive article defined in claim 1 in which said tessellated sheet comprises a tough, organic polymer and metallic flakes.

9. The electromagnetic-radiation-absorptive article defined in claim 1 in which said tessellated sheet comprises neoprene and nickel flakes.

References Cited in the file of this patent

UNITED STATES PATENTS

| | | |
|---|---|---|
| 1,576,730 | Marth | Mar. 16, 1926 |
| 1,610,423 | Cawley | Dec. 4, 1926 |
| 2,053,173 | Astima | Sept. 1, 1936 |
| 2,205,466 | Caprio | June 25, 1940 |
| 2,234,621 | Brous | Mar. 11, 1941 |
| 2,349,440 | Lavoie | May 23, 1944 |
| 2,399,124 | Kahr | Apr. 23, 1946 |